United States Patent
Tanguay

[15] 3,701,370
[45] Oct. 31, 1972

[54] MULTIPLE SAW TREE SLASHER

[72] Inventor: Jean Paul Tanguay, Roberval, Quebec, Canada

[73] Assignee: Placements Jean Paul Tanguay Ltee, Roberval County, Quebec, Canada

[22] Filed: Aug. 20, 1970

[21] Appl. No.: 65,546

[52] U.S. Cl. ................................................... 143/46
[51] Int. Cl. ..................................................... B27b 5/00
[58] Field of Search ....... 143/46 R, 46 A, 46 B, 46 C, 143/46 D

[56] References Cited

UNITED STATES PATENTS

| | | | |
|---|---|---|---|
| 3,500,882 | 3/1970 | Tanguay | 143/46 R |
| 2,569,878 | 10/1951 | Avinger | 143/46 R |

Primary Examiner—Harrison L. Hinson
Attorney—Raymond A. Robic

[57] ABSTRACT

A tree slasher having a feed conveyor and a sawing and discharging station at the downstream end of the conveyor. The tree stems moved by this feed conveyor are discharged into a transfer table which has a stop plate at the end thereof to stop the tree stems once on the transfer table. Two spaced saws are mounted over the transfer table and swing from an inoperative retracted position to an operative position to saw the tree stems. The saws are spaced from one another and from the stop plate distances that correspond to the length of logs required. A discharge conveyor is provided alongside the transfer table to displace the logs in the same direction and load them into a waiting vehicle. Sweeping blades displaceable across the transfer table move the logs into the discharge conveyor.

5 Claims, 4 Drawing Figures

INVENTOR
Jean Paul TANGUAY

ATTORNEY

MULTIPLE SAW TREE SLASHER

The present invention relates to a multiple saw tree slasher and is an improvement of the invention described in my prior Canadian Pat. No. 796,109, granted on Oct. 8, 1968 and my U.S. Pat. No. 3,500,882 granted on Mar. 17, 1970.

In the above-mentioned patents, logs are first obtained on a transfer table by cutting the tree stems with a first saw, the logs being then discharged into a conveyor running perpendicularly from the transfer table. This second conveyor is provided with a central rotary saw capable of sawing the logs discharged from the transfer table into two.

I have found important disadvantages with slashers of this type. As explained and described in my previous patents, the saw on the feed conveyor as well as the one on the discharge conveyor, and the discharge conveyor itself, are all driven in unison by a single power source located beneath the feed conveyor. The fact that the discharge conveyor stands perpendicular to the feed conveyor results in a complicated design insofar as the power drive is concerned. This situation is rendered even more difficult if it is considered that the discharge conveyor has to be removable so that the slasher may be reduced in width when it is necessary to displace it. This is achieved by removing the discharge conveyor and placing it on the feed conveyor.

It is therefore an object of the present invention to overcome these disadvantages by providing a tree slasher that can cut tree stems into two or more logs of predetermined length, transfer the logs thus obtained into a discharge conveyor that runs lengthwise of the first conveyor whereby to thus substantially reduce the overall width of the slasher without having to remove the discharge conveyor.

Another object of the invention lies in providing a slasher of the aforementioned type wherein the power drive for the conveyors and saws can be simplified by providing a discharge conveyor which is stationary with respect to the slasher body.

The above-mentioned object can be attained in a multiple saw tree slasher according to the invention having a feed conveyor to move the tree stems in a predetermined direction and a sawing and discharging station at the downstream end of the conveyor. According to the invention, the latter station comprises a transfer table which is coaxial with the feed conveyor and which is disposed at the downstream end thereof to receive tree stems. Means are provided at the end of the table opposite the discharge and of the feed conveyor to stop the tree stems moved thereon by the feed conveyor. There are at least two spaced rotary saws mounted for swinging motion across the transfer table between an inoperative retracted position allowing free movement of the tree stems onto the transfer table to an operative position wherein the stems are sawed into logs. The saws are spaced from one another and one of them from the stem stop means distances that are equal to the length of logs required. Finally, a discharge conveyor is mounted alongside the transfer table and is adapted to displace logs received from the transfer table in the predetermined direction to discharge them into a receiving vehicle while means are provided for moving the logs from the transfer table into the discharge conveyor.

It is believed that a better understanding of the invention will be afforded by the description that follows of a preferred embodiment thereof having reference to the appended drawings wherein.

The tree slasher described herein is for particular use on a mobile tree slasher of the type described and claimed in my previous patents although this need not necessarily be so since the tree slasher can be a stationary unit as will easily be gathered from the following description.

Figure 1:
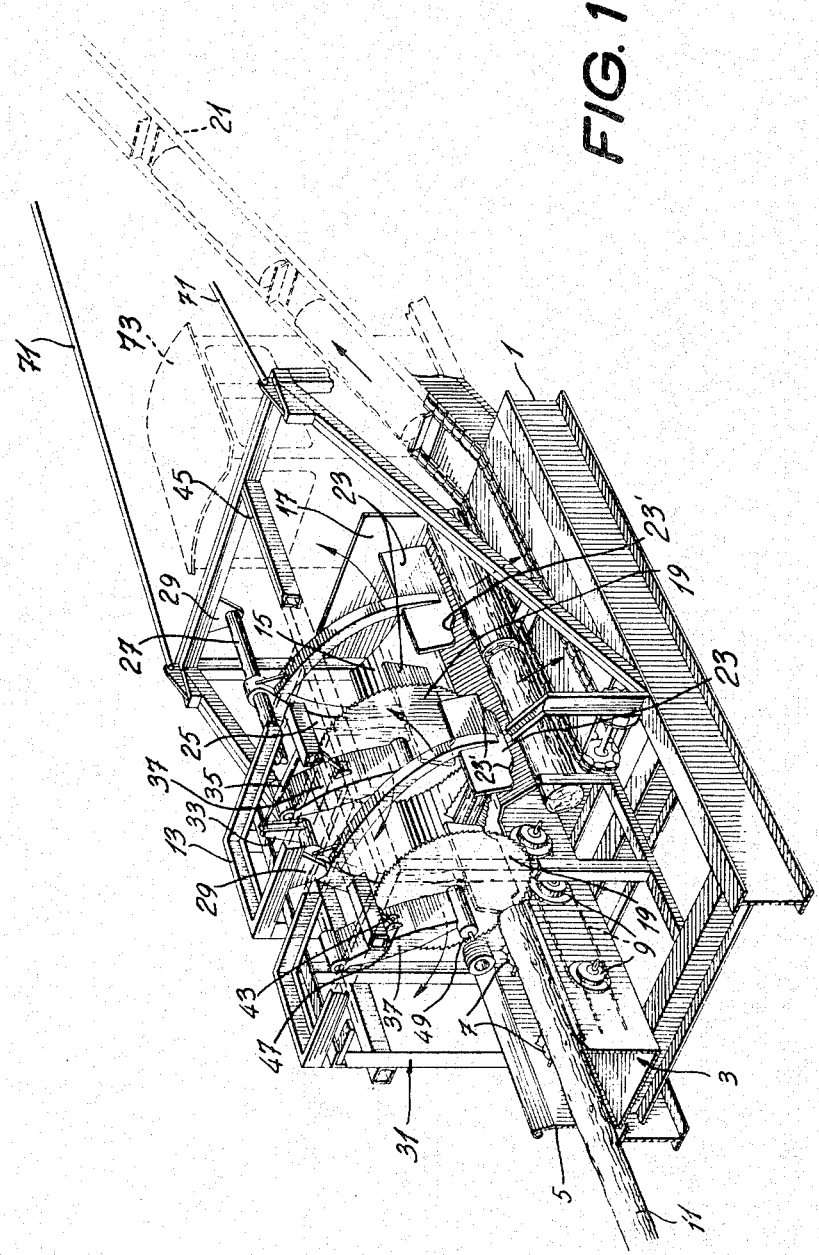
FIG. 1 is a perspective view of the multiple saw tree slasher of the invention, partly shown in cross-section with certain parts removed to facilitate understanding of the description.

As shown in the drawings, the tree slasher is formed of a fabricated base 1 made of metal shapes over which is mounted a feed conveyor 3 formed of a trough-shaped body 5 having a plurality of gripping rollers 7 of the type described in my previous patents. Rollers 7 are mounted for rotation on two side walls of the trough-shaped body 5 and are driven into rotation by means of a sprocket and chain arrangement 9 of conventional design, as shown in FIG. 1.

Rollers 7 are of the gripping type, that is they are provided with a series of spaced radial plates having serrated arcuate outer edges secured to a central hub.

Feed conveyor 3 is adapted to move the tree stems 11 onto a sawing and discharging station generally indicated by numeral 13 and also mounted on the base 1.

Generally, the sawing and discharging station comprises a transfer table 15 coaxial with the feed conveyor 3 and disposed at the downstream discharge end of conveyor 3 to receive the tree stems 11. This transfer table is provided with means, in the form of an upstanding arresting plate 17 fixed at the end of table 15 opposite the discharge end of the conveyor 3, to stop the tree stems 11 moved thereon by the feed conveyor 3.

The tree stems 11 are cut into logs by at least two spaced rotary saws 19 mounted for swinging motion across the transfer table 15 and between an inoperative retracted position allowing free movement of the tree stem on the transfer table 15 to an operative position, shown in FIG. 1, wherein the stems are sawed into logs. Saws 19 are spaced from one another and one of them from the arresting plate 17 distances equal to the length of logs required.

The logs thus obtained are swept laterally on a discharge conveyor 21 by sweeping ejectors, to be more fully described hereinafter, including sweeping blades 23.

Figure 3:
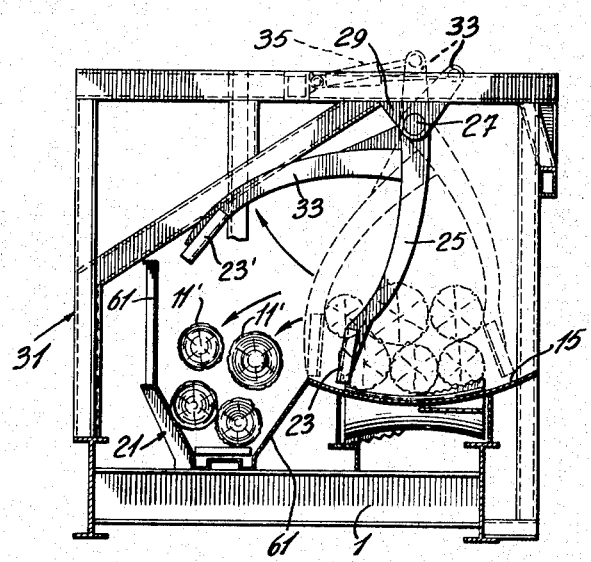
FIG. 3 is an end view intended to illustrate the log sweeper assembly adapted to transfer logs from the feed to the discharge conveyor.

As best illustrated in FIG. 3, the top of transfer table 15 is arcuate in cross-section and is preferably made up of two sections, one between the two saws 19 and another one between the downstream saw 19 and the arresting plate 17. In this manner, it will be possible to insert gripping rollers at the beginning of the transfer table as well as between the downstream saw 19 to help move the tree stems against the abutment plate 17.

Each sweeping ejector is shown to comprise an arm 25 pivotally mounted at one end to a shaft 27 carried by a pair of spaced brackets 29 secured at the top of a supporting structure 31 upstanding from the base 1.

The arms 25 of the pair of ejectors are pivoted by spaced links 33 fixed to shaft 27 and the outer free ends thereof are pivotally connected to the rod of a hydraulic motor or jack 35 of which the cylinder is pivotally mounted on the top of structure 31, as illustrated in FIG. 3.

The aforementioned sweeping blades 23 are solid with arms 25 at the lower ends thereof.

Each ejector is preferably provided with a further arm 33 at the lower end of which is fixed a sweeping blade 23', identical to sweeping blade 23 of the first arm 25. This second arm 33 may be secured to the first arm 25 immediately below the pivot shaft 27.

In this manner, blades 23, 23' of this forked ejector or sweeping assembly may thus serve as side guards for retaining the logs 11' on the transfer table 15 during the sawing operation. The forked ejectors are then rocked by means of the hydraulic motor 35 to move from the position shown in dotted lines in FIG. 3 to that shown in full lines for transferring the logs 11' into the discharge conveyor 21.

Figure 2:
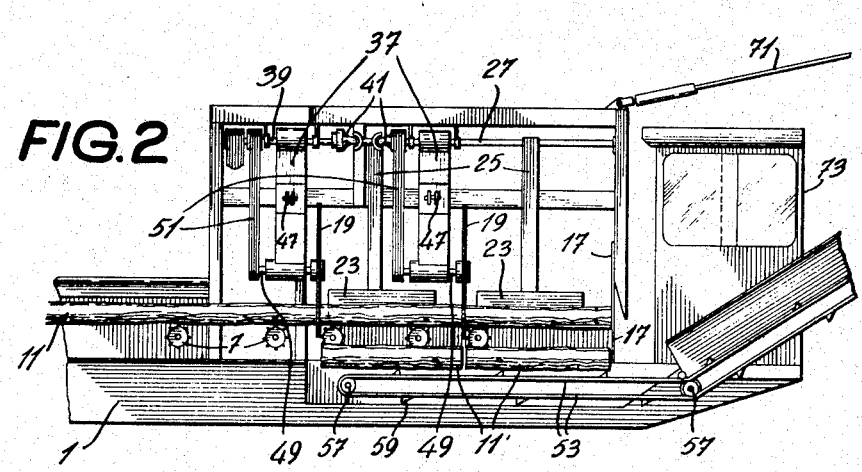
FIG. 2 is a side elevation view of the slasher of FIG. 1.

As shown, particularly in FIGS. 1 and 2, the two saws 19 are mounted for rotation at the lower ends of a pair of levers 37 the other ends of which are pivotally mounted on a driving shaft 39 (FIG. 2) also intended to drive the saws 19 into rotation. Driving shaft 39 may be in two sections interconnected by a universal joint 41.

Levers 37, and thus saws 19, are brought into swinging motion by means of hydraulic motors or jacks 43 having one end pivotally mounted on a longitudinal member 45 of the top of supporting structure 31 while the other end is pivotally mounted onto brackets 47 provided generally centrally of levers 37.

The saws 19 are borne by shafts 49 journalled at the lower end of the levers 37, which shafts are brought into rotation by belt and pulley arrangements 51 of conventional design and part of which are provided on the driving shaft 39.

The sweeping blades 23 may be cut out at the ends thereof, as at 23', to allow for the presence of gripping rollers adjacent saws 19 on the transfer table 15.

An important feature of the invention is that the logs 11' are transferred from table 15 into a discharge conveyor 21 the travelling direction of which is parallel to the longitudinal axis of base 1 as well as the travelling axis of feeding conveyor 3. This will allow to substantially reduce the overall width of the slasher as compared to that of my previously mentioned patents and will make it much easier to move the slasher to a new location as it will not be necessary that the discharge conveyor be removed.

Figure 4:
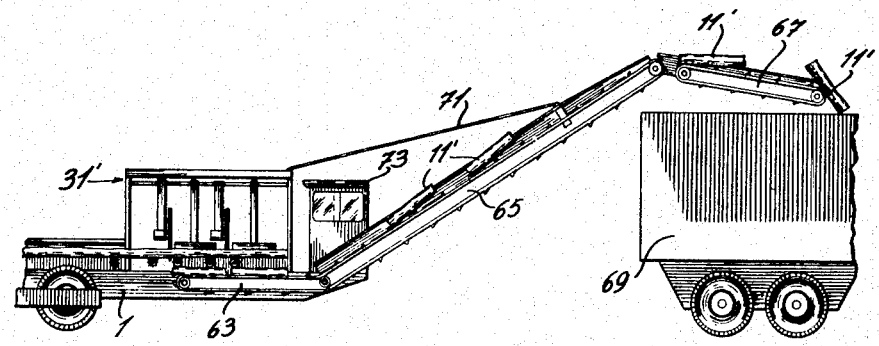
FIG. 4 is also a side elevation view, on a smaller scale than that of FIG. 2, intended to illustrate logs being discharged from the slasher into a waiting vehicle.

The latter may be of conventional design and preferably formed of two sections, a horizontal one discharging into an inclined one as shown in FIGS. 2 and 4.

Each section may be formed of a pair of parallel chains 53 winding around sprockets 57, transverse angular pushers 59 being connected to the two chains 53 to move logs 11' into the travelling direction. Side guards 61 are provided on either side of endless conveyors 53, 57, 59 to keep logs 11' thereon.

As mentioned previously, a horizontal section 63 of the discharge conveyor may feed into an upwardly inclined section 65 and, additionally, a further end section 67 may lead the logs 11' into the container of a waiting vehicle 69. Section 65, pivoted to section 63, may be retained in position by adjustable cables 71 secured at one end to the top of the upstanding structure 31.

An operating cab 73 may be provided rearwardly of the slasher and on one side thereof as shown in FIGS. 1, 2 and 4.

I claim:

1. A multiple saw tree slasher having a feed conveyor to move tree stems in a predetermined direction and a sawing and discharging station at the downstream end of said conveyor, wherein said sawing and discharging station comprises:
   a. a transfer table coaxial with and in the continuation of said feed conveyor and disposed at the downstream discharge end thereof to receive tree stems moved by said feed conveyor;
   b. means at the end of said table opposite said discharge end to stop the tree stems moved thereon by said feed conveyor;
   c. at least two spaced saws mounted for swinging motion across said transfer table between an inoperative retracted position allowing free movement of said tree stems onto said transfer table to an operative position wherein said stems are sawed into logs;
   d. said saws being spaced from one another and one of them from said stem stop means distances equal to the length of logs required;
   e. a discharge conveyor mounted alongside said transfer table; said discharge conveyor adapted to displace logs received from said transfer table in said predetermined direction to discharge them into a receiving vehicle;
   f. wherein said transfer table is formed of a top which is arcuate in cross-section;
   g. log moving means comprises a pair of blades extending longitudinally of said transfer table between said rotary saws and between said stem stop means and the adjacent rotary saw, and
   h. means to rock said blades at unison between a first position on the side of said table away from said discharge conveyor and a second position on the opposite side of said table.

2. A slasher as claimed in claim 1 wherein said rocking means comprises arms pivotally mounted at one end for rocking about an axis parallel to said predetermined direction.

3. A slasher as claimed in claim 2 wherein said log moving means comprises further blades extending longitudinally of said table on the side across from said first blades when the latter are in said first position, said further blades being provided at the ends of further arms fixedly secured to said first arms to form therewith a forked ejector.

4. A slasher as claimed in claim 1 including means for swinging said saws between said retracted and sawing positions, said swinging means comprising levers pivotally mounted at the upper ends thereof for swinging motion between said retracted and sawing positions and about an axis parallel to said predetermined axis, said saws being rotatably mounted at the lower ends of said levers.

5. A slasher as claimed in claim 1 wherein said feed conveyor is a gripping conveyor and said transfer table comprises two transversely arcuate tops spaced from one another and wherein at least one gripping roller is provided between said arcuate tops.

* * * * *